June 5, 1928.

B. McCOLLUM 1,672,495

METHOD AND APPARATUS FOR DETERMINING THE CONTOUR OF SUBTERRANEAN STRATA

Original Filed Aug. 14, 1922   3 Sheets-Sheet 1

INVENTOR.
Burton McCollum

Patented June 5, 1928.

1,672,495

UNITED STATES PATENT OFFICE.

BURTON McCOLLUM, OF CHEVY CHASE, MARYLAND.

METHOD AND APPARATUS FOR DETERMINING THE CONTOUR OF SUBTERRANEAN STRATA.

REISSUED

Application filed August 14, 1922, Serial No. 581,866. Renewed March 5, 1928.

My invention relates to methods of determining the contour of subterranean strata or boundaries of geologic formations, and has among its objects the study of the geological conditions at depths that cannot be conveniently and economically reached by ordinary means. In particular, I have found that by the use of my invention it is possible to determine the location of deposits of various ores, mineral oils, and other valuable materials. My invention depends on the well known principle that if a sound wave be transmitted through the earth partial reflection of the wave takes place at the boundary between any two masses which differ in respect to certain of their physical properties. By properly utilizing the transmitted and reflected waves I am able to determine accurately the location, shape, and extent of such boundaries, which information is of great value for the purposes stated above. My invention is further described in the following specification, reference being made to the accompanying drawings.

For the sake of clearness and brevity my invention is described below with particular reference to but one of its practical applications, namely, the location of deposits of mineral oils and natural gases. It will readily be seen however, that the method may be applied to determining the location of many other kinds of mineral deposits.

Figure 1:
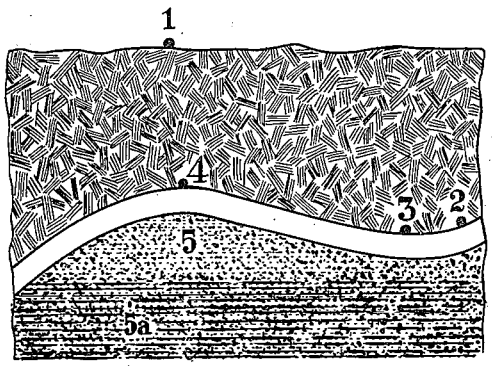
Fig. 1 is a diagram showing the relation between the contour of subsurface strata and the occurrence of certain valuable mineral deposits.

It is well known that in regions where deposits of oil or gas may be encountered the deposits are not distributed generally throughout the area, but are highly localized in pools occupying a relatively small portion of the total potential oil bearing area. The location of these pools is governed by a well known principle illustrated in Fig. 1. In this figure, (1) is the surface of the ground and (2) a dense subterranean stratum of irregular contour concave upward at (3) giving a synclinal fold, and convex upward at (4) giving an anticlinal fold. It is well known that in a potential oil bearing region the oil and gas accumulate locally at (5) under the anticlinal fold (4), it being forced upward into this position by the heavier salt water stratum (5ª) beneath it. The problem of locating a pool of oil in a potential oil bearing region is therefore, one of determining the location of these anticlinal folds in the subterranean rocks. This latter, as stated above, is one of the objects of my invention.

Figure 2:
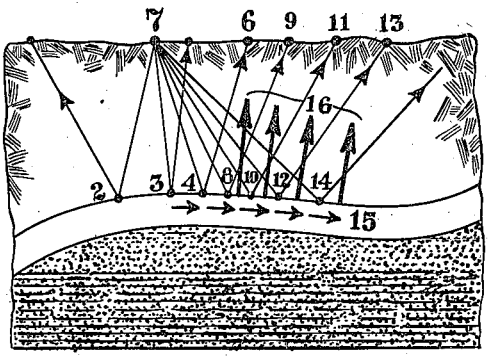
Fig. 2 shows the principle of methods that have heretofore been unsuccessfully tried to accomplish the object here sought.

Heretofore, numerous investigators have endeavored to determine the contour of subterranean strata by the use of sound waves reflected from them, but up to the present time none of these methods has been successful. Fig. 2 illustrates some of the fundamental difficulties that have confronted all these previous attempts and prevented their successful application.

In their fundamental principles these methods have all comprised a source of sound (7) which has heretofore always been placed either on or below the surface of the earth. The theory is that sound travels out radially in all directions and is in part reflected from the boundary 2, 3, 4, 8, 10, and 12, the part of the wave incident at the point (8) being reflected to the point (9), that part incident at (10) being reflected to the point (11), and so on, the angle of reflection being equal to the angle of incidence. It is evident that if only this simple condition existed and if we could clearly distinguish at any point of known position such as at (11) for example, between the direct transmitted wave (14) which goes either directly or through shallow subsurface strata to the point (11), and the wave reflected to the point (11) from the point (10), we could by well known means calculate the depth of the point (10) on the reflecting surface. Serious difficulties of a practical nature prevent the realization of this simple set of conditions. In the first place, the velocity of sound in the rock layer (2) is practically always much greater than in the surface strata. On this account when the slowly travelling sound wave reaches the nearest point, as at (3), of the reflecting rock layer, a sound wave of relatively high velocity moves along the rock layer as shown by the arrows (15), and all the while a portion of the energy of the wave is being diffracted upward into the overlying strata as indicated by the arrows (16), and this diffracted energy moves upward and may reach the point (11) before the arrival of the true reflected wave from the point (10), since this latter, although travelling by a somewhat shorter path, must travel all the way through the medium of low velocity. Furthermore, it will be seen that this initial diffracted disturbance arriving at (11) will be immediately followed by others caused by the transmitted wave striking portions of the rock layer (2) at (8) and other points intermediate between (12) and (10), so that a continuous train of diffracted disturbances will be detected at (11) which will completely obscure the arrival of the true reflected wave.

Figure 3:
Figs. 3 and 4 are typical examples of records showing difficulties confronting previous attempts to accomplish the results obtained by my invention.

Fig. 3 shows a typical record which reveals clearly the seriousness of this difficulty in practice. This is a record of disturbances received at the detector placed at a point corresponding to the point (11) due to a single quick pulse of sound sent out from the source at the point (7). In consequence of the combined effect of the direct transmitted waves, of which there are three distinct types, namely, a compression wave, a transverse wave, and a surface or Rayleigh wave, all of which travel at different velocities and therefore reach the detector at different times, and further, the innumerable diffracted waves due to the reaction on the two former by the subterranean reflecting surfaces as described above, the record becomes so complex that the effect of the arrival of any pure reflected wave is entirely obscured so that the record is entirely worthless for the purpose desired.

Figure 4:

It will be evident that this difficulty will be the greater the more remote is the detector at the point (11) from the source (7), and that it can be diminished by placing the detector close to the source. This is shown by comparing Figs. 3 and 4. These two records are the result of the same source of sound at (7) but in Fig. 3 the receiver was 150 feet from the source, while in Fig. 4 it was but 50 feet away. Interchanging receivers give identical effects showing that the difference in form is not due to the influence of the receivers. The sensitivity of the recording instrument was, of course, adjusted to give suitable sensitivity in the two cases.

Although these diffraction effects may be thus diminished by bringing the detector closer to the source, the disturbances produced by the direct transmitted waves mentioned above become much more violent in comparison with the reflected waves so that if the distance is made short enough to substantially eliminate diffraction effects the transmitted waves completely obscure the advent of any reflected waves. It is evident, therefore, that no location of the detector can be found that will permit it to distinguish definitely between the true reflected wave and disturbances due to diffraction and direct transmission. Similar disturbances result in the case wave trains are used in lieu of single pulses.

I have now invented a very simple expedient whereby the foregoing troubles can be entirely obviated. I accomplish this end by placing the detector or the source, preferably the latter, high up in the air and so arrange the two that the direction of the reflected waves reaching the detector makes only a very small angle with the direction of the transmitted waves, preferably not more than a few degrees. This angle is made small, as in the arrangements hereinafter described, by causing the distance, measured vertically between the shot or sound wave source and the detector, great as compared with the horizontal distance between the detector and the sound wave source or shot. By keeping this angle small, the diffraction disturbances are avoided and by placing the source at a considerable elevation above the surface of the earth the difficulties due to the direct transmitted wave are not only eliminated, but this wave becomes very useful as will appear from the following detailed description of the essential features of my invention.

Figure 5:
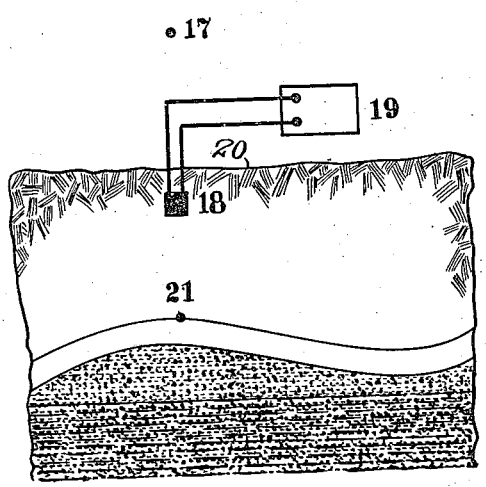
Fig. 5 shows in diagrammatic form a practical embodiment of my invention.

My invention will be clearly understood by reference to Fig. 5. The source of sound (17) is placed high up in the air. This source may be of any suitable kind, but I prefer to use a short abrupt sound such as that produced by firing a charge of explosive or by the sudden release of gas under pressure. Approximately below the source (17) and either on or slightly below the surface of the earth, I place a detector (18) which may be of any type, such as a microphone, piezo-electric crystal, or electromagnetic detector. Wires extend from this detector to a recording device (19) of a type to record the difference in time between two or more events. The well known oscillograph having constants adapting it to this particular work is typical of the recording devices which I have found suitable. It will be evident that if a sudden sound be produced at the source (17) the wave will travel downward and strike the surface of the earth (20) where a considerable part of the energy will be reflected and pass off into space. A part, however, will be transmitted to the earth and this portion immediately produces an effect on the detector (18) which is near the surface and this effect is recorded on the recorder (19). This point on the record is then used as the zero of time to which subsequent recorded events are referred. The wave then travels downward until it strikes the first reflecting surface (21) where a part of its energy is reflected upward to the surface, where it again affects the detector, and the time elapsing between the arrival of the reflected wave and the arrival of the transmitted wave will be determined. The velocity of sound in the overlying stratum can be determined and the depth of the surface from which reflection takes place can be readily calculated from this velocity and the measured time interval between the arrival of the direct transmitted wave and the reflected wave. It will be evident that if the depth of the reflecting surface be determined at a sufficient number of points the contour of this surface will be known.

Figure 6:
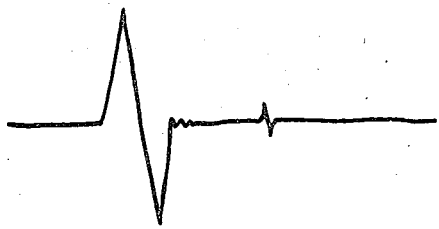
Fig. 6 shows a typical record obtainable through the use of my invention.

It will be quite evident that with this arrangement of apparatus the effects on the detector of both the Rayleigh wave and the transverse wave in the earth will be eliminated, and only those effects due to the compression wave will be recorded in either the transmitted or reflected wave, thereby greatly simplifying the record. It will also be very evident that all diffraction effects, such as those described above, will not affect the detector. In consequence of this a very simple form of record, like that shown in Fig. 6 is obtained where the different events can be clearly distinguished and the time intervals accurately measured.

A further consideration of very great practical importance has to do with the relative intensity as shown by the record of the direct wave, actuating the receiving device, and of the reflected wave coming back from the surface under investigation. It will be seen that the sound wave emanating from the source (17) travels out spherically in all directions, and the intensity of the wave at any point is governed by the inverse square law. Suppose, for example, that the height of the source (17) above the detector (18) is equal to the depth of the reflecting surface (21). In that event when the sound wave reaches the detector (18) it has a certain intensity. Suppose now that 100% of the energy of the wave is reflected from the surface (21). It will be evident that when the reflected wave front has travelled back again to the detector (18) the total distance which it will have traversed from the source (17) will be three times as great as the distance traversed by the direct wave in going from the source (17) to the detector (18). The intensity of the reflected wave when it reaches the detector would therefore be only one-ninth of the intensity of the direct wave. If, as is usually the case in practice, only a fraction of the energy is reflected from the surface (21), the intensity of the reflected wave becomes still further reduced. If now the sensitivity of the arrangement is made great enough to give a sufficiently large effect due to the reflected wave, the disturbances due to the direct wave will be so great that they may interfere seriously with the proper interpretation of the records. It will be evident, therefore, that in general it will be necessary to take steps to increase the amplitude of the reflected wave, relative to that of the direct wave. I have devised several means of accomplishing this result, each and all of which comprise a part of my invention.

One of the means whereby I increase the intensity of the reflected wave relative to that of the direct wave, is by putting a source of sound very high up in the air as compared to the depth of the stratum under investigation. As seen from the example given above, if the depth of the stratum is substantially equal to the height of the source, then assuming 100% reflection the intensity of the reflected wave at the receiver will be only one-ninth of the intensity of the direct wave. Suppose, however, that the source be put to a height above the detector of say five times the depth of the reflecting stratum under study. In that case the reflected wave travelling back to the detector will have travelled about 40% farther from the source than the direct wave, when the two pass the detector. Applying the inverse square law it will be seen that in this case, assuming 100% reflection, as before, the intensity of the reflected wave at the detector will be 1/1.96, or approximately one-half of that of the direct wave, as compared with the ratio one-ninth, when the source is placed at the lesser elevation. It will therefore be seen that by putting the source very high in the air in comparison with the depth of the stratum under investigation, it is possible, because of the inverse square law of propagation of sound waves, to greatly increase the intensity of the reflected wave in comparison with that of the direct wave. In practice I prefer to elevate the source to a height at least as great as the depth of the reflecting stratum, and preferably to several times this height.

It is not to be understood that there is a critical height of the source 17 of the sound energy utilized which under all circumstances is to be exceeded, nor is it necessary to know either the height of the source 17 nor the depth of the reflecting stratum. In actual practice the procedure is substantially as follows:

A sound wave is produced at any convenient height, as by a charge exploded, say, 1,000 or 2,000 feet above the earth's surface, and a suitable record, as photographic, is taken of the waves actuating or influencing the detector. If upon examination of the record so taken there is revealed a reflected event clearly distinguishable from the after effects of the direct wave, it shows that the explosion occurred at a sufficient height. The significant fact is the time interval between the arrival at the detector of the direct and reflected waves, and it is only necessary to know this time interval, which, when multiplied by the velocity of sound in the overlying medium, gives a distance which is twice the depth of the reflecting stratum. If, on the other hand, the record shows no reflected event clearly distinguishable from the after effects of the direct wave, it is proof that the source of the sound energy was not sufficiently high above the detector, and in such case it is only necessary to take another record with the source of sound at a greater elevation.

Figure 7:
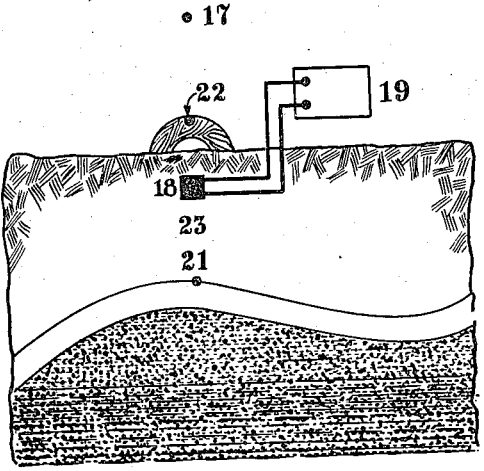
Fig. 7 shows in diagrammatic form the principle of an acoustic shield which I use to improve the character of the graphic records obtained in connection with the application of my invention.

A second means whereby I secure an increased ratio of the intensity of the reflected and direct waves, is by the use of an acoustic shield interposed between a source and the detector. One form of this is shown in Fig. 7. The acoustic shield (22) which can be made up in any form to be substantially sound proof, is placed between the source (17) and the detector (18) and preferably close to the latter. In practice I prefer to put the shield (22) near or on the surface of the earth, as shown in Fig. 7. It will now be seen that the sound energy travelling downward from the source (17) strikes the shield and the earth all around it. The shield (22) may be designed either to reflect or absorb the energy striking it, in which event it will be seen that no sound energy travels directly into the earth at the detector (18). However, in the region all around the shield, the energy passes downward into the earth as will readily be seen, and is gradually diffracted inward underneath the shield into the region (23). By the time the reflected wave from the surface (21) reaches the detector (18) the diffraction will have been sufficient to give nearly a uniform distribution of energy in the reflected wave, and the detector will therefore be actuated by the reflected wave with nearly as much intensity as if the acoustic shield (22) did not exist. At the same time there will be very little effect due to the direct wave, since only a very small amount of the energy of the direct wave will be diffracted directly from the edges of the acoustic shield to the source (18). I have found that in this way I can reduce the intensity of the direct wave at the receiver to a small fraction of what it would be without the shield, and at the same time secure nearly as much effect on the detector from the reflected wave as if the shield did not exist.

Figure 8:
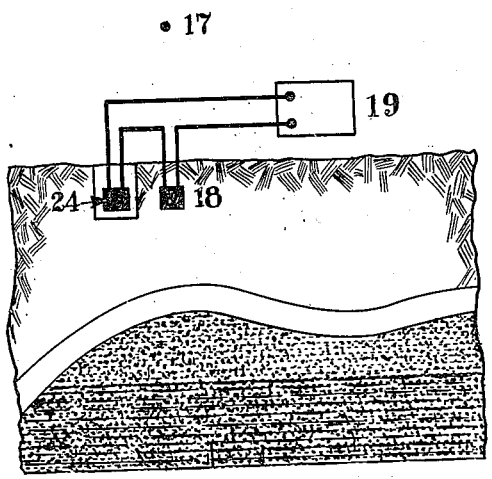
Fig. 8 shows a combination of sound receiving devices which I have found particularly valuable.

A third method which I have devised for reducing the amplitude of the direct wave in comparison with that of the reflected wave is shown in Fig. 8. It is well known that because of the very great difference in the acoustic properties of the earth and air, a sound wave travelling either in the air or in the earth reaching the surface of the earth will be nearly all reflected back into the medium in which it is travelling, thus, as pointed out above, the wave coming from the source (17) up in the air, has most of its energy reflected at the surface of the earth back again into the air and off into the atmosphere. Similarly, that part of the energy which goes into the earth and is reflected back toward the surface from the reflecting surface (21), will on arrival at the surface be again reflected downward, only a small fraction of its energy returning again to the air. By taking advantage of this principle I am able to reduce the intensity of the effect of the direct wave on the detector to any desired degree without materially reducing the intensity of the reflected disturbance which it is desired to record. This is accomplished by the use of two receiving devices as shown in Fig. 8. Here one receiving device (18) is placed in the earth as previously described, in which case it is actuated only by that part of the sound energy passing into the earth. The second receiving device (24) is placed to be responsive to the direct air wave to a much greater degree than to the reflected ground wave, and very close to the dectector (18). In order to make clear the method of functioning of this agreement, let us assume that the sensitivity of the detector (24) bears to the sensitivity of the detector (18) the same numerical ratio as the sound energy transmitted to the earth bears to the total sound energy incident on the surface of the earth from the source (17). In that case it is obvious that the total effect produced on the detector (24) will be just equal to the total effect produced on the detector (18), due to the direct wave coming from the source (17). Consider now what happens when the reflected wave arrives again at the surface after having been reflected from the subsurface (21). This wave travelling in the earth gives full effect on the detector (18) embedded in the earth, but on reaching the surface nearly all of its energy is again turned back in a downward direction, only a small fraction of it being transmitted to the air where it can affect the detector (24). It will be seen, therefore, that the effect of the reflected wave will be enormously greater on the detector (18) than it is on the detector (24), whereas the effect of the direct wave on the two detectors will be substantially equal. If now the two detectors (18) and (24) are coupled together in such manner that they tend to neutralize each other as regards their effect on the recording device, then the direct wave will produce no effect on the records provided the two detectors are adjusted to give equal and opposite impulses, whereas the reflected wave will be recorded through the detector (18) at almost its full value. In practice I prefer not to completely eliminate the direct wave on the record so that I do not adjust the detectors (18) and (24) so that they exactly neutralize each other. I prefer to adjust them so that the resultant effect of the two, due to the direct wave, is only a small fraction of the effect produced on either instrument alone, as this gives an indication on the record showing the time of arrival of the direct wave, which is useful as a basis of reference for the time scale. It will be seen, therefore, that by proper adjustment of the relative sensitivity of the two detectors in Fig. 8, the relative intensity as shown on the record of the direct and reflected waves can be controlled to any desired extent. In practice any one of the above described means for controlling the relative intensity of the effects of the direct and reflected waves may be used, or any two or all of them may be used in combination if desired.

Figure 9:
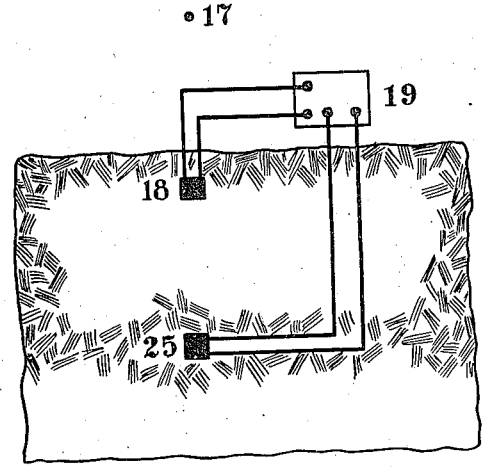
Fig. 9 shows an arrangement of portions of the apparatus for determining the velocity of sound in the earth.

In order to measure the velocity of sound in the stratum between the surface of the earth and the reflecting surface under investigation I place two receiving devices in the earth as shown in Fig. 9, one (18) at a suitable distance below the surface, and the second (25) a known distance below it, substantially in line with the direction of propagation of the sound wave. The difference in time of arrival of the sound wave at the two receivers is measured by means of a recorder from which, and the known distance between the receivers, the velocity is readily obtainable. In some cases where there is reason to believe that the velocity of sound in the overlying stratum may vary with depth, several indicating devices may be placed at various depths in order that the law of variation of velocity with depth may be determined.

I have found that in order to secure a good sensitivity in the indicating devices and also in order to eliminate spurious disturbances due to vibrations of receiving devices themselves, it is desirable to have the microphones very firmly fixed in contact with the earth. This can be done by making a hole, placing the microphone in it filled either with earth or other suitable binding material and thoroughly tamping the filling material in place around and above the detector. This procedure, however, is difficult and time consuming and renders very difficult the recovery of the indicating device, especially when buried to a considerable depth, after the records have been taken.

Figure 10:
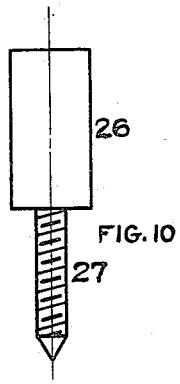
Fig. 10 shows a preferred method of fixing the sound receiving device in contact with the earth.

I have devised a very simple and convenient means of firmly attaching the receiving device to the earth which eliminates these troubles. This is shown in Fig. 10, where the receiving device is mounted inside of a rigid case (26) which may be of metal or other suitable material. In the base of this case is firmly attached a large screw (27), suitable for screwing into the earth. To place a receiving device in position I first bore a small hole, large enough to accommodate the receiver and extending to the desired depth, after which the receiver is placed down in the hole with the screw downward and by means of a suitable long handled wrench the receiver case is turned so as to drive the screw firmly into the earth. After the records have been taken the receiver can readily be unscrewed from its position and brought to the surface. As stated above, any one of the usual types of receiving devices may be used. I have found, however, that instead of using a single receiving element it is often desirable to use a considerable number of such elements grouped in a single unit in order to increase the sensitivity and reliability of the receiving apparatus. This is particularly true in case carbon microphones are used as receiving devices. These microphones, when used singly exhibit certain inherent instabilities frequently called frying, which gives rise to more or less erratic pulsations of current flowing in the microphone, which in turn produces disturbances on the record, especially where a very sensitive recorder is used. This trouble is especially serious if one attempts to use a very large current in the microphone in order to increase the sensitivity. This difficulty can be greatly minimized by using a large number of microphone elements connected in parallel, but such a simple arrangement cannot be used in practice. It is well known that in order to use a microphone successfully and secure good sensitivity in detecting disturbances of relatively low frequencies, it is necessary to use it in conjunction with a mutual inductance having an iron core, and further, that the current flowing through the primary of this mutual inductance, which of course is the current flowing through the microphone, must be kept small enough so as not to produce saturation in the iron core. This fact places a limit on the number of microphones that can be used in parallel on a single mutual inductance, and with the usual forms of inductance practically nothing is gained by the use of more than one or two microphones in this way. I have, however, devised an arrangement whereby the ordinary forms of iron core mutual inductance may be used effectively with a large number of microphone elements in proper combination.

Figure 11:
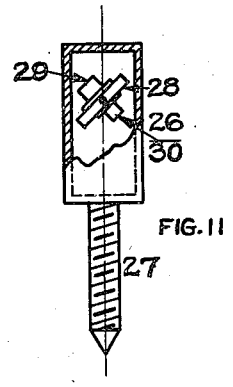
Fig. 11 shows an improved form of a sound receiving device which is useful in connection with my invention.
Figure 12:
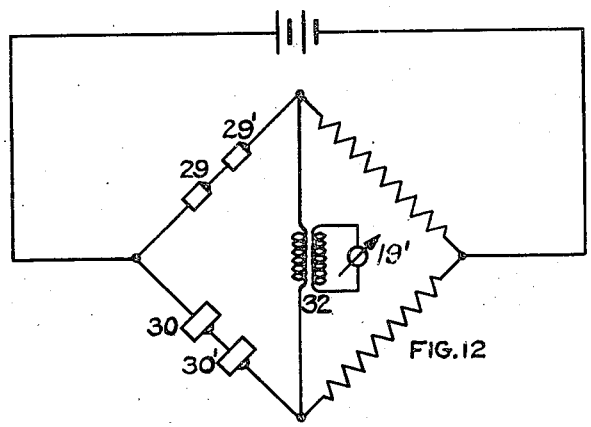
Figs. 12 and 13 show diagrammatic arrangements of microphonic devices which I have found useful in connection with my invention.
Figure 13:
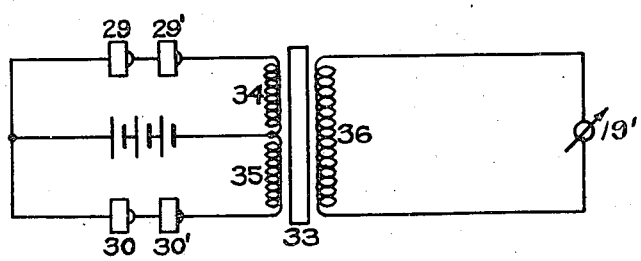

The essential elements are shown in Fig. 11. Inside the receiver case (26) is mounted a rigid plate (28), preferably tilted at an angle with respect to the axis of the case (26). I prefer to make this angle between 30° and 60°, but larger or smaller angles may be used if desired. A terminal of each of the microphone elements (29) and (30) is generally attached to the plate (28), and interposed between this plate and the other terminal of each microphone is placed a cushion of suitable fabric, such as cloth or other material, to serve as a damping agent to prevent vibrations in the microphone when it is actuated. Any desired number of such pairs of microphone elements may be mounted inside the case (26). The receiver case is fixed to the ground with its axis in the direction of the earth displacement which it is sought to record, in this case being vertical. It will be evident that when the earth vibrates due to the passage of a sound wave or pulse, the receiver case is moved up and down with the earth while the heavy case of the microphone elements (29) and (30) tend to stand practically stationary. In consequence of this, it will be seen that the pressure on the microphone elements (29) and (30) will vary as the wave passes, thus causing vibrations in their resistance. It will be noted that when the pressure on the microphone element (29) is increased due to the downward movement of the case (26), the microphone (30) will decrease so that the pulsations of resistance on the two microphone elements will be opposite. In order to make the effects of the two groups cumulative on the recording instrument, either of two arrangements may be used, one of which is shown in Fig. 12. Here all of the microphone elements (29), (29') etc., which are similarly mounted with respect to the plate (28), are placed in one arm of a Wheatstone bridge while all those (30), (30'), etc.,
which are so mounted as to give resistance variations opposite to the ones in group (29), (29'), etc., are placed in the adjacent arm of the bridge. It will be obvious that as the resistance of one group increases and that of the other decreases, the two effects are cumulative in disturbing the balance of the bridge, and therefore in effecting the indications of the oscillograph or other instrument (19') coupled across the diagonal of the bridge. The mutual inductance (32) may or may not be used, as desired. The second arrangement and the one which I prefer to use, is shown in Fig. 13. Here a mutual inductance is used, preferably one having an iron core (33) provided with two primary windings (34) and (35) differentially connected, the winding (34) being in series with the group of microphone elements (29), (29'), etc., and the winding (35) being in series with the group (30), (30'), etc. With this arrangement a large number of microphone elements may be used in each group, and correspondingly large currents sent through the two differentially wound primary coils (34) and (35) without danger of saturating the magnetic circuit. When the current in one circuit increases while that in the other decreases, the effects are cumulative in causing changes in the magnetization of the iron core (33), and hence in actuating the oscillograph (19'), which is connected to the single secondary coil (36). As here shown, the microphone elements (29), (29'), etc., are grouped in series. It will be evident that parallel or series multiple grouping may be used with equal effect, provided the number of turns in the primary coils (34) and (35) of the mutual inductance are made to correspond to the number of microphone elements in series.

A careful consideration of the foregoing discussion reveals that one of the fundamental features of my invention comprises the placing of a source of sound and a receiver in such relation to each other and to the reflecting surface, the depth or contour of which is to be studied, that the angle between the direct transmitted and the reflected waves affecting the receiver is small, whereby the disturbance due to the surface waves, transverse waves, and the innumerable diffraction effects above discussed, are made to disappear. This might, of course, be done by placing both source and receiver in the earth, provided one is placed at a considerable depth, in order to have the receiver remote from the source. It is, however, very difficult, expensive, and time consuming to place the instruments at a great enough depth to be effective. Furthermore, experience has shown that if the source be placed in the earth the available sources of a quick, sharp pulse, such as the firing of a charge of explosive, produce a violent disruptive effect in the earth immediately surrounding it, which in turn tends to change the character of the disturbance from a quick, simple pulse to a complex and greatly prolonged disturbance, thus defeating the object of the arrangement. I have found, however, that if the source of sound be placed high up in the air, preferably high enough so that the wave front striking the earth will be practically a plane wave, this difficulty will be entirely avoided. If the wave front striking the earth be nearly plane, the subsequent diminution of intensity with distance, both before and after reflection, will be relatively slight so that the ratio of the intensity of the transmitted and of the reflected waves will be much smaller than if the wave front striking the earth has a small radius of curvature. For this reason if the the source be placed high up in the air, the intensity of the shock imparted to the earth at any point may be very slight, and nowhere sufficient to cause permanent deformation of the medium, and still give a reflected wave of ample intensity for detection. On the other hand, if the source be placed on the surface or imbedded within the earth, the intensity of the shock at points very close to the source must be very great in order that the reflected wave may be of sufficient intensity, and in practice it is found that permanent deformation of the earth very close to the source always occurs, thus giving rise to the increased complexity and prolongation of the wave above described. It will therefore be apparent that the placing of the source up in the air at a considerable distance from the earth, as hereinabove described, is of fundamental importance in eliminating certain of the practical difficulties that have heretofore been encountered in attempting to explore subterranean strata through the medium of sound waves. Any suitable means may be used for placing the source at a proper elevation. Where circumstances are such that a height of not more than about 100 feet is sufficient, a light telescoping pole or tower can be used successfully. As a rule, however, I have found that it is desirable to place the source at a considerably greater elevation, and when this is desired some other means can be conveniently used for putting the source up in the air. Any one of a number of devices may be used if desired, such as a captive balloon, a kite, an air plane, or recourse may be had to projecting a charge of explosive into the air, the same being fired by a time fuse in accordance with principles well known to military ballistics.

For the sake of brevity in the appended claims, the term "aperiodic" as applied to the sound produced by the source includes an abrupt sound wave or a sound wave impulse or rapidly decadent sound waves, produced by a shot, explosion or equivalent means herein described, as distinguished from sustained, continuous or undamped sound waves.

I claim:

1. The method of determining the contour of a subterranean stratum which consists of sending out a sound wave from a source of sound, causing the said sound wave to be transmitted through the earth to the said subterranean stratum and reflected therefrom, measuring the time interval elapsing between the passage of the said sound wave over a known po nt at a distance from said source and the passage of the reflected wave over the same point, measuring the velocity of sound in the medium between the said known point and the said subterranean stratum and calculating the distance between the said known point and the said subterranean stratum from the said time interval and the said velocity, the said source and the said known point be ng so placed with respect to the said subterranean stratum that the path traversed by the direct wave is substantially identical with the path traversed by the reflected wave.

2. The method of locating a subterranean stratum, which comprises producing an aperiodic sound wave, causing said wave to be transmitted through the earth to the subterranean stratum and to be reflected therefrom, measuring the time interval elaps ng between the passage of said wave past a known point and the passage of the reflected wave past the same point, determining the velocity of sound in the medium between said known point and said stratum, and determining the distance between said known point and said stratum from said t me interval and said velocity, the place of production of said sound wave and said known point being so positioned with respect to said stratum that the paths traversed by the direct and reflected waves are substantially identical.

3. In the art of exploring subterranean regions, the method which compr.ses producing sound at a distance above the surface of the earth, and detecting, and whose distance horizontally from the source of said sound is small compared with its distance vertically therefrom the sound reflected from a subterranean formation.

4. In the art of exploring subterranean regions, the method which comprises producing sound at a substantial distance above the surface of the earth, and detecting the sound reflected from a subterranean format.on at a point through which both the direct and reflected waves pass.

5. In the art of exploring subterranean regions, the method which comprises producing sound at a distance above the surface of the earth, and detecting, at a point adjacent the earth's surface and whose distance horizontally from the source of said sound is small compared with its distance vertically therefrom the sound reflected from a subterranean formation.

6. In the art of exploring subterranean regions, the method which comprises producing sound at a distance above the surface of the earth, and detecting at a point adjacent the earth's surface the sound reflected from a subterranean formation, said point being located adjacent substantially identical paths in which the direct and reflected waves are transmitted.

7. In the art of exploring subterranean regions, the method which comprises producing an aperiodic sound wave at a distance above the surface of the earth, and detecting, and whose distance horizontally from the source of said sound is small compared with its distance vertically therefrom the sound reflected from a subterranean formation.

8. In the art of exploring subterranean regions, the method which comprises producing an aperiodic sound wave at a distance above the surface of the earth, and detecting, at a point adjacent the earth's surface and whose distance horizontally from the source of said sound is small compared with its distance vertically therefrom the sound reflected from a subterranean formation.

9. In the art of exploring subterranean regions, the method which comprises producing sound at a distance above the surface of the earth, and detecting, and whose distance horizontally from the source of said sound is small compared with its distance vertically therefrom the sound transmitted to and reflected from a subterranean formation.

10. In the art of exploring subterranean regions, the method which comprises producing sound at a distance above the surface of the earth, and detecting the sound transmitted to and reflected from a subterranean formation at a point adjacent substantially identical paths over which the direct and reflected waves are transmitted.

11. In the art of exploring subterranean regions, the method which comprises producing an aperiodic sound wave at a distance above the surface of the earth, and detecting, and whose distance horizontally from the source of said sound is small compared with its distance vertically therefrom the sound transmitted to and reflected from a subterranean formation.

12. In the art of exploring subterranean regions, the method which comprises producing an aperiodic sound wave at a distance above the surface of the earth, and detecting the sound transmitted to and reflected from a subterranean formation at a point adjacent substantially identical paths over which the direct and reflected waves are transmitted.

13. In the art of exploring subterranean regions, the method which comprises transmitting sound from a source to a subterranean formation and reflecting it therefrom, producing an effect by the direct sound wave, producing a second effect by the reflected sound wave at a point whose distance horizontally from said source is small compared with its distance vertically therefrom, and producing a composite indication by said effects.

14. In the art of exploring subterranean regions, the method which comprises transmitting sound originating at a distance above the earth to a subterranean formation to be reflected therefrom, producing a plurality of effects by the direct and reflected sounds, and producing a composite indication by said effects, said effects being produced at points adjacent substantially identical paths over which the direct and reflected sounds are transmitted.

15. In a system of the character described, means for transmitting sound through the earth to a subterranean formation to be reflected therefrom, a plurality of detectors affected to greater extents, respectively, by direct and reflected sound, indicating means, and means for causing said detectors to affect said indicating means in opposite senses.

16. In a system of the character described, means for transmitting sound through the earth to a subterranean formation to be reflected therefrom, a plurality of detectors affected to greater extents, respectively, by direct and reflected sound, indicating means, and means for causing said detectors to affect said indicating means in opposite senses, said detectors disposed adjacent substantially identical paths over which the direct and reflected sound is transmitted.

17. In a system of the character described, means for transmitting sound through the earth to a subterranean formation to be reflected therefrom, a plurality of detectors affected to greater extents, respectively, by the direct and reflected sound, and indicating means controlled by said detectors, the source of said sound disposed at a distance above the surface of the earth.

18. In a system of the character described, means for transmitting sound through the earth to a subterranean formation to be reflected therefrom, a plurality of detectors affected to greater extents, respectively, by direct and reflected sound, indicating means, and means for causing said detectors to affect said indicating means in opposite senses, the source of said sound disposed at a distance above the surface of the earth.

19. In a system of the character described, means for transmitting sound through the earth to a subterranean formation to be reflected therefrom, a plurality of detectors affected to greater extents, respectively, by the direct and reflected sound, and indicating means controlled by said detectors, the sound produced by said means consisting of an aperiodic sound wave.

20. In a system of the character described, means for transmitting sound through the earth to a subterranean formation to be reflected therefrom, a plurality of detectors affected to greater extents, respectively, by the direct and reflected sound, indicating means, and means for causing said detectors to affect said indicating means in opposite senses, the sound produced by said means consisting of an aperiodic sound wave.

21. In a system of the character described, means for transmitting sound through the earth to and causing reflection of sound from a subterranean formation, a plurality of sound detectors respectively influenced principally by the direct and reflected sound, a time-indicating device, a transformer in whose secondary circuit said device is connected, and said detectors connected in circuit with the primary windings of said transformer, said primaries being differentially related.

22. In a system comprising a device for determining the contour of a subterranean stratum and comprising a source of sound, sound detectors, and a sound measuring device, the method which comprises placing said source in the air above the surface of the earth, disposing certain of the sound detectors in contact with the earth at points intermediate said sound source and the subterranean stratum, and substantially in line with the normal extending from the subterranean stratum through said source, and placing other of the sound detectors so as to be actuated substantially only by an air wave, and so associated that its effect is opposed to that of sound detectors in contact with the earth, and coupling the time measuring device to said detectors in such manner as to measure the time interval elapsing between the arrival of a direct sound wave at the detectors in earth and air, and of one or more reflected sound waves at the detectors in earth.

23. In a system for determining the contour of a subterranean stratum and comprising a source of sound, sound detectors, and a time measuring device, the method which comprises placing the source of sound in the air above the surface of the earth at a distance greater than the depth of the subterranean stratum, placing the detectors in contact with the earth substantially in line with the normal extending from the subterranean stratum through said source, and coupling the time measuring device to said detectors to measure the time interval elapsing between the arrival of successive sound waves at said detectors.

24. A system for determining the contour of a subterranean stratum comprising a source of sound, a time recording device, microphonic devices, and means for mounting said microphonic devices to effect opposite phase relation of pulsating change of their resistances in their effect upon said recording device.

25. A system for determining the contour of a subterranean stratum comprising a source of sound, a time recording device, microphonic devices electrically connected in parallel, a differentially wound transformer having primary coils connected respectively in series with said microphonic devices and a secondary connected to the time recording device, and means for mounting said microphonic devices to effect opposite phase relation of the pulsations of their resistances in their effect upon said recording device.

26. In the art of exploring subterranean regions, the method which comprises transmitting sound to a subterranean formation to effect reflection therefrom, producing a plurality of effects at points adjacent substantially identical paths over which the direct and reflected sounds are transmitted, and producing a composite indication by said effects.

In testimony whereof, I affix my signature.

BURTON McCOLLUM.